US006470741B1

(12) United States Patent
Fathollahzadeh

(10) Patent No.: US 6,470,741 B1
(45) Date of Patent: Oct. 29, 2002

(54) HOT WIRE ANEMOMETER GAS FLOW SENSOR HAVING IMPROVED OPERATION AND COMPENSATION

(75) Inventor: Kiomars Fathollahzadeh, Stockholm (SE)

(73) Assignee: Instrumentarium, Inc., Helsinki (FI)

( * ) Notice: Subject to any disclaimer, the term of this patent is extended or adjusted under 35 U.S.C. 154(b) by 0 days.

(21) Appl. No.: 09/599,903

(22) Filed: Jun. 23, 2000

(51) Int. Cl.$^7$ ................................................ G01F 1/68
(52) U.S. Cl. .................... 73/204.15; 73/204.18
(58) Field of Search ................... 73/204.15, 204.18, 73/861.85, 204.11

(56) References Cited

U.S. PATENT DOCUMENTS

| | | | |
|---|---|---|---|
| 4,794,794 A | | 1/1989 | Djorup |
| 4,807,151 A | * | 2/1989 | Citron ........................ 364/510 |
| 4,934,188 A | * | 6/1990 | Tanimoto et al. ......... 73/204.14 |
| 4,934,189 A | * | 6/1990 | Tanimoto et al. ......... 73/204.14 |
| 5,018,385 A | | 5/1991 | Frick |
| 6,032,526 A | | 3/2000 | Akamatsu |

FOREIGN PATENT DOCUMENTS

EP          628715          12/1994

* cited by examiner

Primary Examiner—Benjamin R. Fuller
Assistant Examiner—Corey D. Mack
(74) Attorney, Agent, or Firm—Andrus, Sceales, Starke & Sawall, LLP

(57) ABSTRACT

A hot wire gas flow rate sensor having a bridge circuit with a sensing resistor avoids saturation of the signal processing circuitry at high gas flow rates by increasing a bias signal to a differential amplifier in the signal processing circuitry in a step-like manner as the flow rate responsive signal to the differential amplifier from the sensing resistor increases. The differential input signal to the amplifier is thus maintained at a level that avoids saturation of the amplifier. Appropriate scaling is provided to the output circuitry of the sensor in accordance with changes in the bias signal so that the sensor output correctly indicates gas flow rates. Compensation is provided for changes in gas composition and when the sensing resistor is changed by determining the voltage drop across a first sensing resistor with a gas of known composition at a zero gas flow condition. The voltage drop across a second sensing resistor at the zero gas flow condition for the gas is also determined. When sensing the flow rate with the second sensing resistor, the ratio of these voltage drops is applied to the flow responsive component of the voltage drop across the second sensing resistor. This compensates the flow responsive voltage drop component for changes in sensing resistor resistance. The voltage drop across the sensing resistor is determined at zero gas flow when the gas composition changes and ratioed to the voltage drop obtained with the known composition gas to compensate for changes in gas composition.

28 Claims, 5 Drawing Sheets

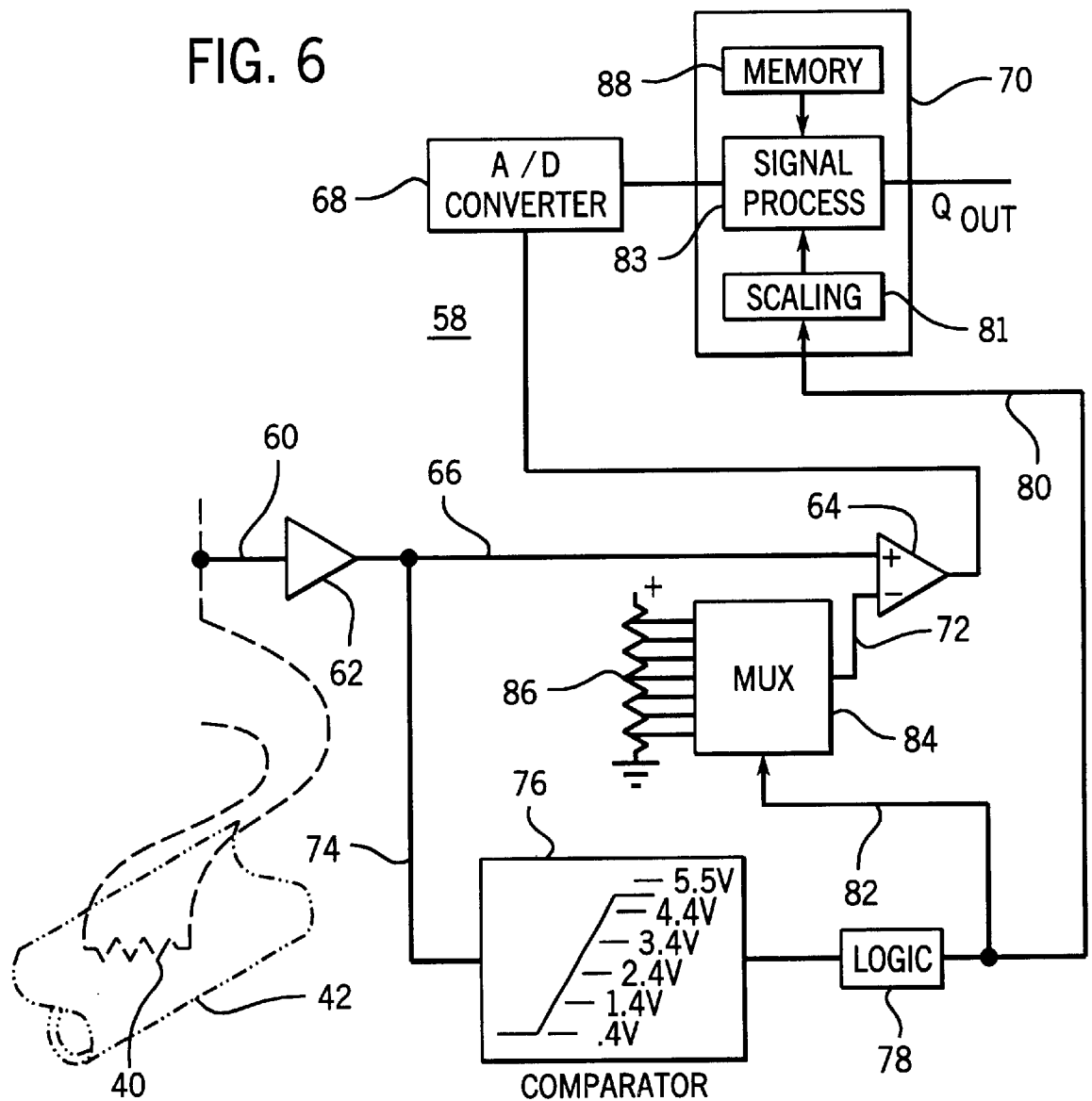

HOT WIRE ANEMOMETER GAS FLOW SENSOR HAVING IMPROVED OPERATION AND COMPENSATION

BACKGROUND OF THE INVENTION

The present invention relates to gas flow sensors employing a heated resistance wire, commonly called hot wire anemometers.

Numerous applications require measurement of the flow rate of a gas or mixture of gases. One such application is in medical apparatus, such as ventilators, for measuring the flow rate of inspiratory breathing gases supplied to a subject by the ventilator and the flow rate of the breathing gases expired by the subject. Measuring the flow rate of expired breathing gas is particularly difficult due to the wide range of instantaneous gas flow rates found during expiration, variations in the composition of the exhaled breathing gases, the moisture and sputum exhaled in the breathing gases, and for other reasons.

Hot wire gas flow sensors, or anemometers, have found use as expiratory breathing gas flow sensors in ventilators and similar equipment. In the simplest form of such a flow sensor, a thin, resistive wire, usually of platinum, is positioned in an airway flow conduit through which the expiratory gases pass. The wire typically extends transverse to the gas flow direction through the conduit. The platinum wire resistor forms one arm of a Wheatstone bridge circuit. The other arms of the bridge circuit contain other resistors, one or more of which may be variable. A power supply is connected across one pair of terminals of the bridge circuit and an indicator device is connected across the other pair of terminals of the bridge circuit.

Energization of the bridge circuit passes current through the platinum resistor to increase its temperature and cause it to become a "hot wire." The resistance of a platinum wire resistor, is proportional to its temperature. As the gas flows past the hot wire, the wire is cooled, altering the resistance of the resistor. The resulting resistance imbalance in the bridge circuit, as sensed in the indicator device, is an indication of the flow rate of the gas passing the hot wire resistor.

In another embodiment of such an anemometer, as the resistance of the wire resistor changes due to gas flow, the energization of the bridge is altered to keep the current through the wire resistor constant. The voltage drop across the resistor becomes an indication of the gas flow rate.

Or, as the resistance of the wire resistor changes responsive to gas flow, the current through the platinum wire resistor is adjusted to keep its temperature, and hence its resistance, constant. The resulting voltage drop across the resistor is the indication of the flow rate of the gas.

While highly suited as a means for measuring gas flow rates, certain problems have heretofore attended the use of hot wire anemometers. One problem is the inaccuracy of such sensors means at high flow rates. Because of the wide range of flow rates encountered in an application such as expiratory breathing gas measurement, this inaccuracy can be a serious problem. The inaccuracy is due in part to the fact that, for proper operation, the sensor requires an adequate amount of gain in the signal processing circuitry for the bridge circuit output signals. This gain drives the signal processing circuitry into saturation at the signal levels associated with high flow rates.

Also, as derived more fully below, the mass flow rate of a gas is related to the voltage across the wire resistor by the ¼th power. This means that the flow rate voltage signal curve is steep at low flow rates, but flat at high flow rates. This, in turn, causes the sensor to be highly accurate at low flow rates, but inaccurate at high flow rates. While the gain of the signal processing circuitry might be increased at high flow rates to improve high flow rate accuracy, this exacerbates the problem of saturation in the circuitry noted above.

A further problem that has been heretofore encountered with hot wire anemometers arises during replacement of the wire sensing resistor due to breakage or other reasons. The resistance of the wire sensing resistor depends on the length of wire forming the resistor. In practical embodiments of hot wire anemometers, the resistance of the sensing resistor inevitably varies from resistor to resistor. Replacement of a sensing resistor of one resistance with a sensing resistance of a different resistance has heretofore made it necessary to perform a calibration of the gas flow rate sensor, usually under field service conditions. To carry out the calibration most accurately requires a gas source that provides gas of a given composition over a known range of flow rates. This requirement has rendered calibration of hot wire gas flow rate sensors when the sensing resistor is replaced awkward, time consuming, and expensive.

A third problem is that the sensor characteristics are dependent on the composition of the gas or gases, the flow rate of which is being measured. When the measured gas is a mixture of gases, the mass concentration of the various components may vary. For example, when expired breathing gases are being measured, the composition may vary dependent on the oxygen uptake by the patient or the amount of carbon dioxide exhaled by the patient. To convert the mass flow measurement obtained by the hot wire anemometer to a volume flow measurement requires knowing the viscosity of the gas. While several techniques are available to obtain the conversion to volume flow, these tend to be rather complex and ill-suited for practical application.

SUMMARY OF THE INVENTION

It is, therefore, the object of the present invention to provide a hot wire anemometer and operating methods for same that overcome the shortcomings currently encountered with such devices.

It is a further object of the present invention to provide a hot wire anemometer flow sensor which exhibits a high level of gas flow rate measurement accuracy over a wide range of flow rates, including high gas flow rates.

A still a further feature of the present invention is to provide a technique for hot wire anemometers that avoids the need for a calibrating gas source when the sensing resistor is replaced, thereby greatly facilitating such replacement while, at the same time, maintaining the accuracy of the gas flow rate sensor.

It is yet another object of the present invention to provide a technique for hot wire anemometers that enables the anemometer to accurately determine gas flow rates for gases of differing composition.

The present invention obtains improved gas flow rate measurement accuracy for a hot wire anemometer of the constant temperature type over a wide range of flow rates, including high gas flow rates as follows. The signal processing circuitry for the anemometer contains a differential amplifier, a first input of which receives a signal corresponding to the voltage drop signal across the hot wire sensing resistor. A bias signal is provided to the second input of the differential amplifier to form a differential input signal to the amplifier. The magnitude of the voltage drop signal to the differential amplifier is sensed and the bias signal is established at a level that limits the magnitude of the differential input signal to a value not greater than one that which would drive the differential amplifier into saturation. Specifically, as the magnitude of the voltage drop signal increases, with an increasing gas flow rates, the voltage drop signal is compared with a plurality of reference values to provide a step-like increase in the magnitude of the bias signal. This ensures that the magnitude of the differential input signal to the amplifier is limited to a value that does not drive the differential amplifier into saturation, even at the high voltage drop signals associated with high gas flow rates. Saturation of the differential amplifier in the signal processing circuitry for the anemometer under these conditions is thus avoided. A signal is provided to output circuitry for the anemometer to provide appropriate scaling as the magnitude of the bias signal changes, so that the output of the anemometer is an accurate representation of the sensed gas flow rate.

The present invention also avoids the need to calibrate the sensor using a calibration gas source when a first sensing resistor is replaced with a second sensing resistor. To this end, the technique of the present invention employs the unique insight that the ratio of flow related components of the voltage drops across two different sensing resistors at a given gas flow rate is the same as the ratio of the voltage drops for the two resistors obtained at zero gas flow conditions. The magnitude of the latter components can be easily obtained from operation of the bridge circuit without the need for a calibrating gas source.

When the second sensing resistor is used to sense a gas flow rate, the ratio of the zero flow voltage drops for the first and second resistors is applied to the flow induced component of the voltage drop across the second sensing resistor resulting from gas flow past the resistor. This causes the flow component voltage drop for the second resistor to be the same as that which would have been obtained by the first sensing resistor. The operation of the gas flow sensor is thus not altered even though the sensing resistor has been changed.

The manner in which the foregoing is carried out is as follows. The bridge circuit containing the first sensing resistor is operated under zero gas flow conditions to establish a balanced condition in the bridge circuit at a desired current through the sensing resistor. The voltage drop across the first sensing resistor at such conditions is determined and retained as a compensating value. When the first sensing resistor is replaced with a second sensing resistor, the bridge circuit containing the second sensing resistor is operated at zero gas flow to establish a balanced condition in the bridge circuit with the desired current through said second sensing resistor. The second sensing resistor is exposed to the same gas, such as air, as the first sensing resistor. The voltage drop across the second sensing resistor under such conditions is determined. A ratio of the zero gas flow voltage drops so determined across the first and second sensing resistors is established which, when applied to the flow induced component of the voltage drop across the second sensing resistor when sensing gas flow, compensates the sensor for the replacement of the first sensing resistor by the second sensing resistor.

The present invention also provides a technique for compensating a gas flow rate sensor of the hot wire type for changes in the composition of gases, the flow rate of which is being measured. At zero gas flow, the bridge circuit containing the hot wire sensing resistor is operated with the sensing resistor exposed to gas of a first, known composition, such as air, and a balanced condition established in the bridge circuit at a desired current through the sensing resistor. The voltage drop across the sensing resistor at such conditions for gas of the first composition is determined. At zero gas flow conditions, the bridge circuit is operated with the sensing resistor exposed to a second gas for which the flow rate is to be measured. The voltage drop across the sensing resistor at such conditions for the second gas is also determined. A ratio of the voltage drops so determined across the sensing resistor is established which, when applied to the flow induced component of the voltage drop across the sensing resistor when sensing the flow of the second gas, compensates the sensor for changes in the composition between the first and second gases.

Various other features, objects, and advantages of the invention will be made apparent from the following detailed description and the drawings.

BRIEF DESCRIPTION OF THE DRAWING

FIG. 6 shows the hot wire flow sensor of the present invention.

DETAILED DESCRIPTION OF THE INVENTION

The Wheatstone Bridge

Figure 1:
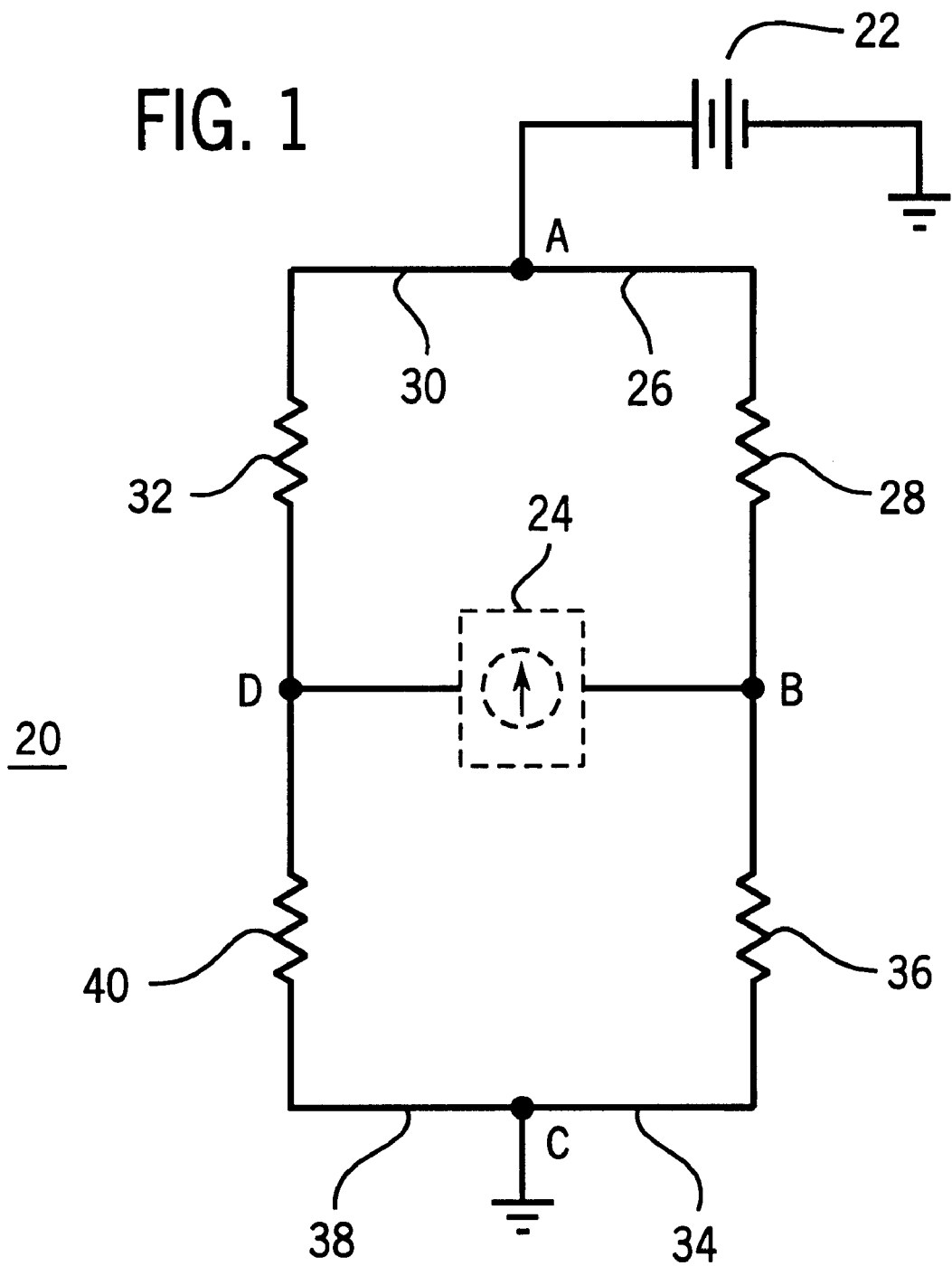
FIG. 1 is a schematic diagram of a Wheatstone bridge circuit.

The construction and operating principles of a simple bridge circuit of the type employed in the sensor of the present invention are described below in connection with FIG. 1. The bridge circuit shown in FIG. 1 is commonly termed a Wheatstone bridge. Bridge circuit 20 has input terminals A and C connected to a voltage source 22 and a pair of output terminals B and D which may be connected to an output indicating device 24, such as a galvanometer. Bridge arm 26 extends between input terminal A and output terminal B and contains resistor 28. Bridge arm 30 extends between input terminal A and output terminal D and contains resistor 32. Bridge arm 34 extends between input terminal C and output terminal B and contains resistor 36. Bridge arm 38 extends between input terminal C and output terminal D and contains resistor 40.

The operation of bridge circuit 20 is as follows. Assume resistor 28 has a value of 100 ohms, resistor 36 has a value of 1,000 ohms, resistor 32 has a value of 300 ohms and resistor 40 has a value of 3,000 ohms. Voltage source 22 provides a voltage of 1.5 volts across input terminals A and C. The current provided by the voltage of source 22 will divide in the parallel current paths with 1.36 milliamps flowing in the path A, B, C and 0.45 milliamps flowing in the path A, D, C. The 1.36 milliamp current passing through the 1,000 ohm resistor 36 will provide a voltage drop of 1.36 volts across the resistor and at output terminal B. The 0.45 milliamp current through the 3,000 ohm resistor 40 will also provide a 1.36 volt potential drop across this resistor and at output terminal D. With the same voltage appearing at output terminal B and D, no current will flow through output device 24. Output device 24 will indicate that bridge circuit 20 is in the balanced or null condition.

Assume, now, the resistance of resistor 40 changes to 2,000 ohms. The 1.5 volts of source 22 passing through the series connected resistor 32 and 40 of 300 ohms and 2,000 ohms, respectively, will provide a 0.65 milliamp current in the path A, D, C. The 0.65 volt current passing through the 2,000 ohm resistor 40 will provide a voltage drop of 1.3 volts across the resistor. The current and voltages existing in the path A, B, C remain unchanged as does the 1.36 volt potential at output terminal B. The voltage at output terminal D is now 1.3 volts. There is thus a 0.06 volt (60 millivolt) potential difference existing at output terminals B and D, with output terminal B being positive with respect to output terminal D. This circumstance, when sensed by output device 24, indicates that bridge 20 is no longer in the balanced condition.

In an analogous manner the resistance of resistor 40 may increase to 4000 ohms. This causes a current of 0.35 milliamps to flow through the path A, B, C. The 0.35 milliamp current when applied to resistor 40 of 4000 ohms, causes a voltage drop of 1.4 volts across the resistor and a corresponding voltage to appear at output terminal D. The voltage at output terminal B remains unchanged at 1.36 volts. There is now a 0.04 volt (40 millivolt) difference between the voltages at output terminal B and output terminal D, with terminal D being positive with respect to terminal B. This voltage difference, when applied to output device 24 also indicates an unbalanced condition of the bridge with the polarity of the voltage indicating the relative magnitude of the resistance of resistor 40 with respect to the resistance of resistor 36.

Bridge Circuit Flow Meters

The resistance of a resistor, such as a one formed from platinum wire, changes with its temperature. Passing current through the resistor will heat the resistor. Exposing the resistor to a flowing gas will decrease the temperature and resistance of the resistor as the gas carries off heat. The change in temperature, and hence resistance of a resistor exposed to a gas flow is dependent on the mass flow rate (dm/dt) of the gas.

Figure 2:
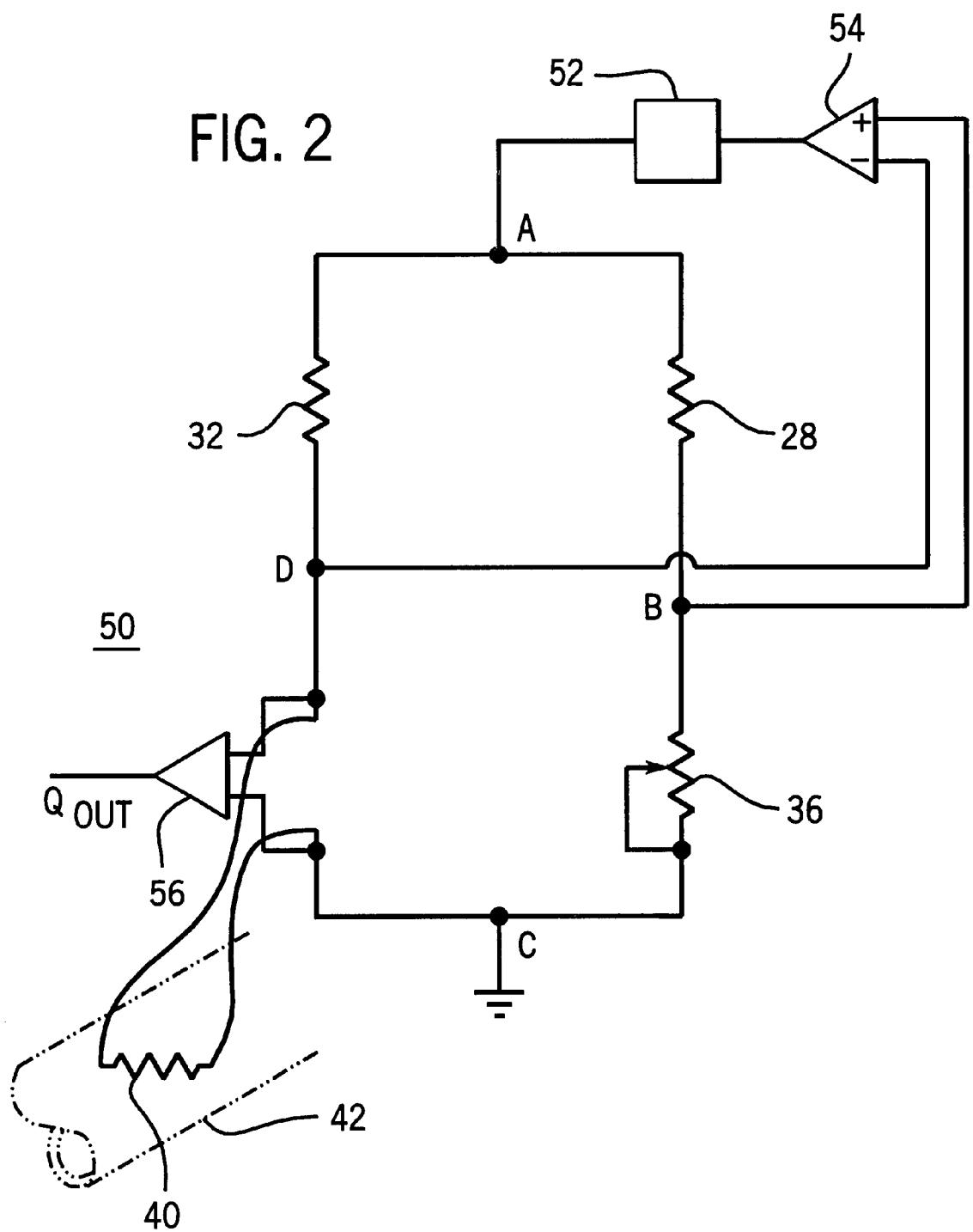
FIG. 2 is a simplified schematic diagram of a bridge circuit hot wire flow sensor of the constant temperature type.

A bridge circuit in which one of the resistors, for example resistor 40, is a platinum wire exposed to the gas, may thus form a gas flow sensor. As shown in FIG. 2, the platinum wire resistor is typically placed in a conduit 42 or chamber for the gas and transverse to the direction of flow of the gas. In one embodiment of such a sensor, the amount of imbalance in the bridge circuit produced by the change of resistance of resistor 40 is an indication of the gas flow rate. Typically in such a gas sensor, the resistances of the resistors, including wire resistor 40 would be considerably less than those described in explanatory fashion in connection with FIG. 1. For example, the resistance of resistor 40 would usually be about 3–5 ohms.

In another embodiment of a bridge circuit gas flow sensor, the output of the bridge can be applied to the input of a current regulating loop that maintains the bridge in the constant current condition as the resistance of resistor 40 varies responsive to gas flow. The voltage across the variable resistance of the sensing resistor supplied with the constant current then becomes an indication of the gas flow rate.

Constant Temperature Bridge Circuit Flow Meters

A bridge circuit can also be operated in yet another manner to serve as a gas flow rate sensor. Rather than allowing the temperature and the resistance of the wire sensing resistor, such as resistor 40, to vary responsive to changes in gas flow rates, the power source for the bridge can be controlled to maintain the temperature and resistance of resistor 40 constant as the gas flow rate changes. The amount of current supplied to the bridge will vary since, as resistor 40 cools from increased gas flow, more current must be supplied to heat the resistor and increase its resistance back to the value selected to be constant, and vice versa. The voltage drop across the resistor maintained at a constant temperature by the variable current is used as the indication of the gas flow rate.

FIG. 2 shows, in simplified form, a gas flow rate sensor incorporating bridge circuit 50 constructed and operated to carry out gas flow rate sensing in the foregoing manner. The energization of bridge circuit 50 is provided by driver 52 operated by differential amplifier 54. Amplifier 54 is connected across the output terminals B, D of bridge circuit 50. Amplifier 54 operates driver 52 to supply a voltage to terminal A that provides current in paths A, B, C and A, D, C that places the bridge circuit in the balanced state. Resistor 36, which may be a potentiometer, can be adjusted so that the balanced state is achieved at a desired current through resistor 40 at zero gas flow. Amplifier 56 is connected across resistor 40 to measure its voltage drop to provide the indication of the gas flow rate as $Q_{out}$.

When wire resistor 40 is subjected to gas flow in conduit 42, the gas passing the resistor will carry off heat resulting in a cooling of resistor 40. The cooling of resistor 40 will reduce its resistance, unbalancing bridge circuit 50 and causing a difference signal to appear at the input to amplifier 54. This will cause amplifier 54 and driver 52 to increase the voltage applied to input terminal A and the current through the resistors of the bridge, including resistor 40. The increased current passing through the resistance of resistor 40 will increase its temperature which, in turn, will increase its resistance. When the increased current restores the temperature and resistance of resistor 40 to original values, bridge circuit 50 will again be in the balanced state.

The voltage drop across resistor 40 will be increased due to the increased current through resistor 40. The voltage drop across resistor 40 is obtained by amplifier 56 as an indication of the increased gas flow rate as $Q_{out}$.

When the gas flow rate decreases, the flow rate sensor operates in a corresponding, but opposite, manner.

Considering more specifically the heat transfer characteristics of resistor 40, for the temperature of the resistor to remain constant, the energy generated in the wire of the resistor by the current passing through the resistor must equal the energy removed from the resistor by the gas flowing past it. Assuming that convection is the only mechanism by which energy is lost, conduction and radiation effects being negligible, the heat supply and removal characteristics of resistor 40 can be expressed as:

$$I_w^2 R_w = hA(T_w - T_f) \tag{1}$$

Or:

$$I_w = [hA(T_w - T_f)/R_w]^{1/2} \tag{2}$$

Where $I_w$ is the current through wire ("w") resistor 40

$R_w$ is the resistance of resistor 40

$T_w$ is the temperature of resistor 40

$T_f$ is the temperature of the gas flow h is the heat transfer coefficient of the resistor A is the heat-transfer area With respect to the resistor heat transfer coefficient h, according to "King's" law:

$$h = C_0 + C_1 (dm/dt)^{1/2} \qquad (3)$$

where $C_0$ and $C_1$ are the constants depending on the properties of the gas and the wire forming resistor 40, and dm/dt is the mean mass flow of the gas, the constant $C_0$ being applicable to zero flow conditions and the constant $C_1$ being applicable when gas is flowing past the wire of resistor 40.

Substituting Equation 3 in Equation 2 gives:

$$I_w = [C_0 A(T_w - T_f)/R_w + C_1 A(T_w - T_f)(dm/dt)^{1/2}/R_w]^{1/2} \qquad (4)$$

The electric signal used for measurement of gas flow, i.e. the voltage drop $V_w$ across resistor 40, is the product of the current through the resistor and its resistance. With the current quantity expressed in Equation 2, the voltage is:

$$V_w = I_w R_w = R_w [hA(T_w - T_f)/R_w]^{1/2} \qquad (5)$$

Or, using the current as expressed in Equation 4 and containing the gas mass flow quantity, the voltage is:

$$V_w = [(C_0 R_w A(T_w - T_f) + C_1 R_w A(T_w - T_f)(dm/dt)^{1/2})]^{1/2} \qquad (6)$$

Equation 6 can be written more simply as:

$$V_w = [V_w(0)^2 + V_w(f)^2]^{1/2} \qquad (7)$$

in which the $V_w(0)$ is the voltage drop existing across the resistor at zero gas flow conditions and $V_w(f)$ is the voltage component produced across resistor 40 when the resistor is subjected to gas flow. The quantity $V_w(0)$ is more specifically:

$$V_w(0) = [C_0 R_w A(T_w - T_f)]^{1/2} \qquad (8)$$

The quantity $V_w(f)$ is more specifically:

$$V_w(f) = [C_1 R_w A(T_w - T_f)(dm/dt)^{1/2})]^{1/2} \qquad (9)$$

Improving Sensor Accuracy at High Gas Flow Rates

Figure 3:
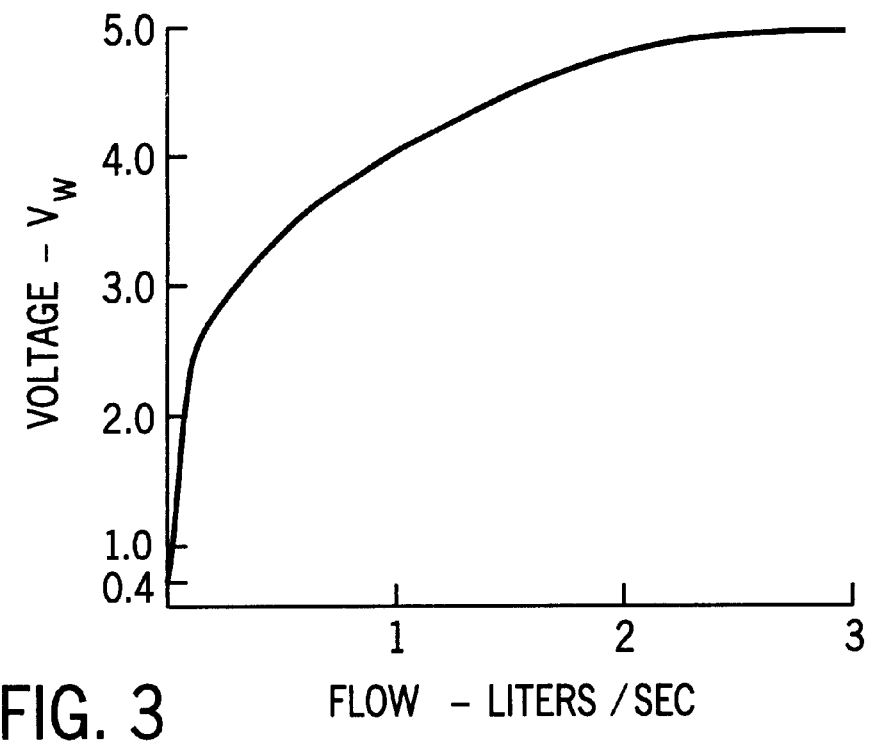
FIG. 3 is a graph showing the relationship between gas flow rates and sensor output in a bridge hot wire flow sensor.

As noted above, one of the problems with gas flow rate sensors of the type shown in FIG. 2 is the decrease in sensitivity and accuracy at high flow rates. In part, this is due to the fact that the signals corresponding to the voltage drop component $V_w(f)$ across resistor 40 are related to the gas flow rate dm/dt by the ¼th power. See Equation 9. A graph representative of such a relationship is shown in FIG. 3 with an amplified voltage $V_w$ on the ordinate and flow rate dm/dt on the abscissa. The voltage shown in the graph is the amplified voltage at the upper end of resistor 40 and at terminal D of the bridge circuit 50, the lower end of resistor 40 adjacent to terminal C being at ground potential.

For explanatory purposes, the flow rates are shown in a range of 0 liters per second up to 3 liters per second. The corresponding amplified voltage range is 0.4 volts to 5 volts, with 0.4 volts corresponding to the voltage on resistor 40 when bridge circuit 50 is in the balanced, zero flow rate condition. As will be seen from FIG. 3, increasing the flow rate from 0 liters per second to 1 liter per second increases the voltage from 0.4 volts to approximately 4 volts, or a difference of 3.6 volts. Increasing the flow rate by another liter per second from 1 liter per second to 2 liters per second increases the voltage from 4 volts to approximately 4.8 volts, or a difference of 0.8 volts. Increasing the flow rate a further liter per second from 2 liters per second to 3 liters per second increases the voltage from 4.8 volts to 5 volts or a difference of only 0.2 volts. Because of the small voltage differences available at high flow rates, the accuracy of the hot wire gas flow rate sensor suffers in this range.

Appropriate accuracy of the sensor at the lower flow rates requires adequate gain in the signal processing circuit for the voltage $V_w$. This, in turn, will cause signal saturation at higher flow rates due to circuitry limitations in the signal processing circuitry for the flow rate sensor. For example, even if a relatively low gain of 5 is applied to the voltages shown in FIG. 3, the output voltage from the signal processing circuitry required to indicate the maximum flow rate of 3 liters per second would be 25 volts. Instrumentation components are not usually designed for voltages of this magnitude but rather for much lower voltages, such as 5 volts.

One approach to solving the foregoing problem is to decrease the gain of the signal processing circuitry at higher flow rates so as to keep the output voltage signals at high flow rates within the operating capabilities of the instrumentation components. However, a reduction in gain further exacerbates the problems of inaccuracy of the gas flow rate sensor at high gas flow rates, due to the small difference signals available.

Figure 4:
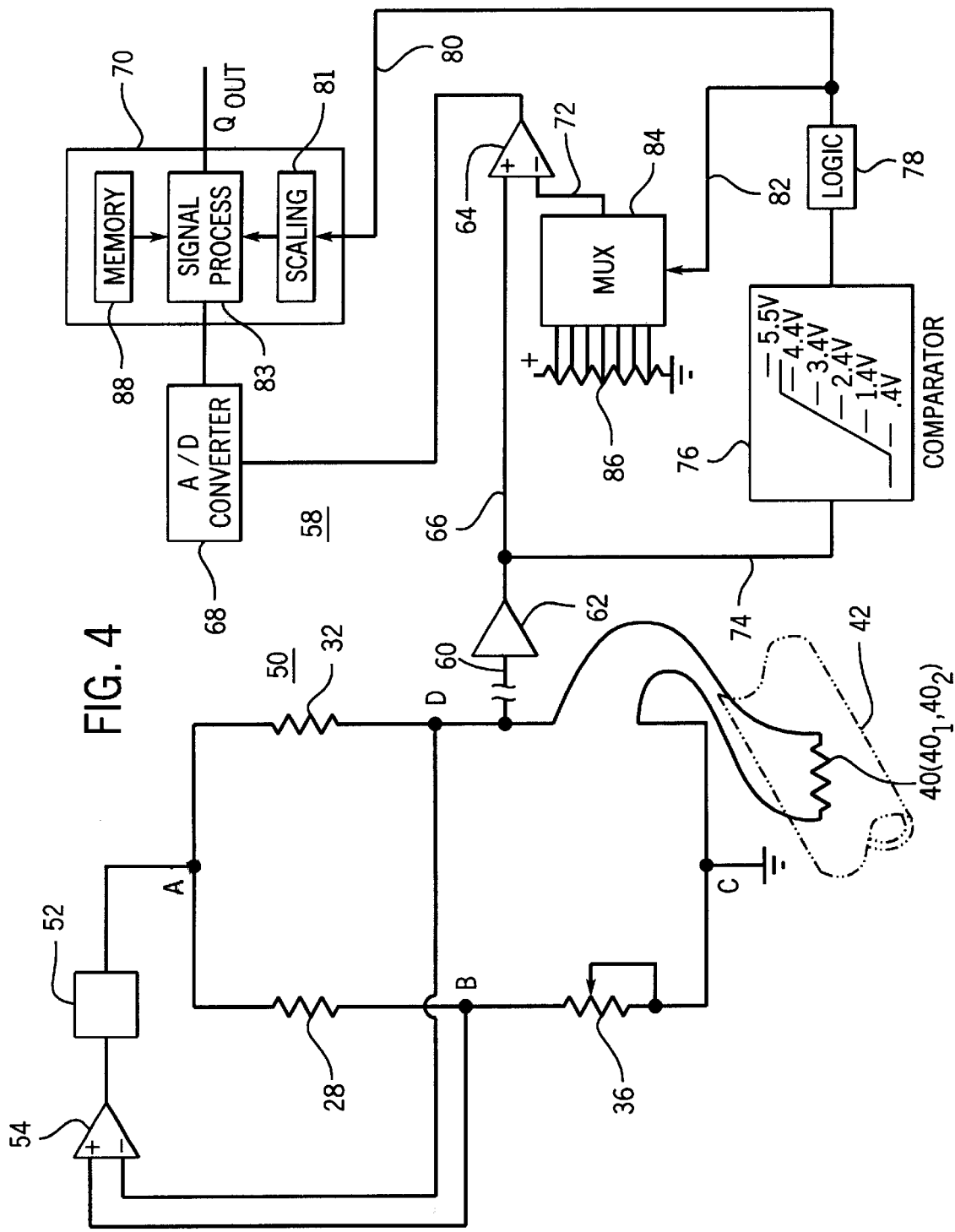
FIG. 4 shows the hot wire flow sensor of the present invention and a Wheatstone bridge circuit with which it may be used.

The technique of the present invention for improving the accuracy of a constant temperature, hot wire flow rate sensor is shown in FIGS. 4 and 6. Common elements found in both FIGS. 2 and 4 are identified by common reference numerals. While certain signal magnitudes and component values and characteristics may be used herein for explanatory purposes and to permit the construction and operation of the invention to be more readily appreciated, it is to be understood that the present invention is not to be limited to any such values.

In gas flow rate sensor 58 of the present invention shown in FIGS. 4 and 6, the voltage drop across resistor 40, i.e. the voltage at terminal D in bridge circuit 50, is provided in conductor 60 to pre-amplifier 62 having an appropriate signal gain, such as 20. The amplified output of amplifier 62 may comprise the 0.4 to 5 volt voltage signal shown in FIG. 3.

The output of pre-amplifier 62 is provided in conductor 66 to one input of differential output amplifier 64, typically to the non-inverting input of the amplifier. Amplifier 64 may have a gain of 5 to provide an overall gain of 100 to the two series connected amplifiers 62, 64. The gain of 5 found in amplifier 64 when applied to the maximum input signal of 5 volts from amplifier 62 would ordinarily result in an output of 25 volts from amplifier 64. This would be considerably greater than a typical maximum output of amplifier 64 which is on the order of 5 volts.

The output of amplifier 64 is preferably provided to analog/digital converter 68 and to output circuitry 70 that provides a digital signal or visual indication of gas flow rates, i.e. $Q_{out}$.

In order to limit the output of amplifier 64 to the maximum value that is within customary operating limitations for such circuit elements, i.e. 5 volts, with a gain of 5 in amplifier 64, it is necessary to limit the differential signal at the input to differential amplifier 64 to not more than 1 volt, even though the output of amplifier 62 and the signal in conductor 66 may vary from 0.4 volts to 5 volts, as shown in FIG. 3.

In accordance with the present invention, this is accomplished by providing a bias signal to the other input of differential output amplifier 64, typically the inverting input, in a manner such that the differential input signal to the amplifier provided by the output of amplifier 62 and the bias signal is a maximum of 1 volt or less under all operating conditions of the sensor. This limitation to the magnitude of the input signal avoids saturation of amplifier 64 and loss of accuracy in the instrument over the operating range of the instrument.

For example, assume the lowest input voltage of 0.4 volts, corresponding to zero gas flow, is supplied from input amplifier 62 in conductor 66 to the non-inverting input of output amplifier 64. If a bias voltage of 0.4 volts is applied to the inverting input of differential amplifier 64 in conductor 72, the differential input signal magnitude to amplifier 64 will be 0 volts. The output of amplifier 64 will also be 0 volts which is supplied to analog/digital converter 68 and output circuit 70 to indicate the zero gas flow condition.

With a bias signal of 0.4 volts applied to the inverting input, as the gas flow rate increases, the voltage in conductor 66 to the non-inverting input of amplifier 64 will increase. When the voltage in conductor 66 increases to 1.4 volts at a flow rate of about 0.1 liters per second for the example shown in FIG. 3, the differential input signal to differential amplifier 64 will increase to 1 volt, i.e. the difference between the 0.4 volts at the inverting input and the 1.4 volts at the non-inverting input. The output voltage of the amplifier will increase to 5 volts, i.e. to that at the saturated condition of the amplifier.

If now, the bias signal in conductor 72 is changed from 0.4 volts to 1.4 volts, the differential input signal will drop to zero. This is because the input signal at the inverting input and the input signal at the non-inverting input of the differential amplifier are now the same, i.e. each at 1.4 volts. This will remove amplifier 64 from saturation and place it at a zero output voltage condition. The output of amplifier 62 may then be further increased without saturating amplifier 64. The fact that the bias voltage on conductor 72 to amplifier 64 has been changed is supplied to output circuit 70 to cause scaling circuit 81 of output circuit 70 to provide appropriate scaling changes in the signal processing circuitry 83 of output circuit 70 so that an indication of the flow rate corresponding to the voltage output of amplifier 62, and ultimately to the voltage drop across resistor 40, is correctly presented by the output circuit.

With a bias voltage of 1.4 volts in conductor 72 to the inverting input of amplifier 64, when the output signal of amplifier 62 in conductor 66 reaches 2.4 volts, the differential input signal to amplifier 64 will again reach 1 volt and amplifier 64 will approach the saturated condition. At this point, the bias signal in conductor 72 is increased to 2.4 volts so that the differential input signal to amplifier 64 again drops to zero. This removes amplifier 64 from saturation. The fact that a new bias signal has been supplied to differential output amplifier 64 is again communicated to output circuitry 70 for the appropriate scaling change by scaling circuit 81 so that the output reading is that corresponding to the flow rate resulting in a voltage of 2.4 volts in conductor 66.

The process of increasing the bias signal in conductor 72 to limit the maximum differential input signal applied to output amplifier 64 can be repeated in steps of 1 volt, i.e. 0.4, 1.4, 2.4 . . . volts up to that used when the maximum output voltage of input amplifier 62 of 5 volts in conductor 66 is provided to the non-inverting input of amplifier 64. Saturation of output amplifier 64 over the entire operating range of sensor 68 is thus avoided.

FIGS. 4 and 6 show one way in which the foregoing technique of the present invention may be carried out. The output of input amplifier 62 is provided in conductor 74 to a comparator 76. Comparator 76 compares the magnitude of the output signal in conductor 74 from input amplifier 62 with a plurality of reference points, at each of which it is desired to change the bias signal applied to amplifier 64 in conductor 72. In the example used above, the reference values would be set at 0.4 volts, 1.4 volts, 2.4 volts, etc., as shown diagrammatically in FIG. 4. The comparison may preferably be carried out on an analog basis but can also be carried out on a digital basis, if desired. For example, comparator 76 may comprise the component sold by Motorola, Inc. under the designation LM339.

Each time a reference value is exceeded, a signal is sent to logic circuit 78 indicating which reference level has been exceeded. Logic circuit 78 provides the signal in conductor 80 to scaling circuit 81 in output circuit 70 that is used for scaling purposes in digital signal processor circuitry 83 in the output circuit. Logic circuit 78 may comprise a conventional HCM05 logic gate such as the elements sold by Texas Instruments, Inc. under the designations 74HC14 (Schmitt trigger NAND gate) or 74 HC86 (EX-OR gate).

The output of logic circuit in conductor 80 is also provided in conductor 82 to multiplexer 84. Multiplexer 84 is provided with a plurality of analog voltages corresponding to the bias levels to be provided to the inverting input of output amplifier 64 in conductor 72 in order to limit the magnitude of the input signal to amplifier 64 to that which avoids saturation of the amplifier. The voltages are shown in an exemplary manner as developed across precision resistor 86. Multiplexer 84 may comprise the component sold by Analog Devices, Inc. under the designation ADG428.

The output signal in conductor 82 operates multiplexer 84 to select the appropriate bias voltage and supply same to amplifier 64 in conductor 72 in accordance with the comparison carried in comparator 76.

While the operation of the present invention has been described above in an example in which the magnitude of the output signal from input amplifier 62 is increasing, it will be appreciated that the circuitry operates in an analogous, but opposite, manner when the magnitude of the output signal from input amplifier 62 is decreasing.

In summary, the operation of the circuitry shown in FIG. 4 and FIG. 6 in the manner described above, avoids saturation of amplification components of the signal processing circuitry over the entire operating range of the sensor, including high gas flow rates. At the same time, it enables the overall gain of the instrumentation to be high enough to provide a high degree of accuracy and sensitivity to the hot wire gas flow rate sensor.

Avoiding Field Calibration when Replacing Sensing Resistor

As noted above, resistor 40 is typically made from platinum. It is usually formed as a fine wire to minimize disturbance of the gas flow and establish the appropriate electrical resistance for resistor 40. As the gas flow sensor is used, it is ordinarily necessary to periodically replace resistor 40 due to breakage of the fine wire from the rigors of extensive use, if the wire becomes encrusted with contaminants in the gas flow, or for other reasons.

The resistance of resistor 40 depends on the length of the wire forming the resistor. While the resistors are produced by high precision manufacturing techniques, the length of the wire, and hence the resistance, inevitably will vary from resistor to resistor. Replacement of a sensing resistor 40 of one resistance value with a sensing resistor of another value will alter the $Q_{out}$ value provided by the sensor for a given gas flow rate and affect the accuracy of the gas flow rate sensor.

In the past, each time a sensing resistor 40 was replaced during use of the sensor, it was necessary to perform a calibration of the sensor. To carry out the calibration most accurately required a gas source providing gas of given composition over a range of known gas flow rates. The requirement for such equipment rendered field calibration of hot wire gas flow rate sensors expensive, awkward, and time-consuming, particularly under field service conditions.

As noted above, a further feature of the present invention is to provide a gas flow rate sensor that avoids the need for such a calibrating gas source when the sensing resistor is replaced in the sensor. This facilitates replacement of the sensing resistor. At the same time, the accuracy of the gas flow rate sensor is retained. This feature of the invention is achieved in the following manner.

Equation 4 is repeated below as Equation (10):

$$I_w=[C_0A(T_w-T_f)/R_w+C_1A(T_w-T_f)(dm/dt)^{1/2}/R_w]^{1/2} \tag{10}$$

The quantity $R_w$ comprising the resistance of resistor 40 may be replaced with its equivalent $r_w l$, where $r_w$ is the resistance of a unit length of the wire forming resistor 40 at the operating temperature, and l is the length of the wire.

At zero gas flow (dm/dt=0), the current through resistor 40 will be:

$$I_w(0)=[C_0A(T_w-T_f)/r_w l]^{1/2} \tag{11}$$

An existing sensing resistor 40 in the gas flow sensor, designated herein as resistor $40_1$, is now to be replaced with a second sensing resistor, $40_2$. The wire lengths of the respective resistors $40_1$, and $40_2$ are $l_1$ and $l_2$. As noted above, the wire lengths of the two resistors will inevitably be different. Wire impurity and thickness deviations among the two sensors are usually negligible and same are ignored in the following description. For two sensing resistors with different wire lengths, $l_1$ and $l_2$, carrying the same current at zero gas flow conditions, the resistor currents would be as follows:

$$I_w(0)=[C_0A_1(T_{w1}-T_f)/r_w l_1]^{1/2}$$

$$I_w(0)=[C_0A_2(T_{w2}-T_f)/r_w l_2]^{1/2}$$

The foregoing can be expressed as:

$$[C_0A_1(T_{w1}-T_f)/r_w l_1]^{1/2}=[C_0A_2(T_{w2}-T_f)/r_w l_2]^{1/2} \tag{12}$$

Removing common terms from both sides of Equation 12 gives:

$$A_1(T_{w1}-T_f)/l_1=A_2(T_{w2}-T_f)/l_2 \tag{13}$$

Since the heat-transfer area $A_1=\pi d\, l_1$ and the heat-transfer area $A_2=\pi d\, l_2$, where d is the wire diameter, Equation 13 can be simplified to:

$$(T_{w1}-T_f)=(T_{w2}-T_f) \tag{14}$$

Or $$T_{w1}=T_{w2} \tag{15}$$

Equation 15 establishes that, at zero gas flow conditions, when two sensing resistors $40_1$ and $40_2$ have the same current and are operated in gas having the same characteristics of temperature, pressure, and composition, the temperature of each of the resistors is essentially the same. Further, that resistor temperature is independent of the lengths of the wire forming the resistors.

The fact that resistors formed of wire of different lengths when supplied with the same current operate at the same temperature is used to maintain the accuracy of the gas flow rate sensor when the sensing resistor is changed in the following manner.

As seen in Equations 7, 8, and 9, the voltage signal developed on sensing resistor 40 in the operation of the gas flow sensor has two components: $V_w(0)=[C_0R_wA(T_w-T_f)]$ which is the offset component produced at zero gas flow; and $V_w(f)=[C_1R_wA(T_w-T_f)(dm/dt)^2)]^{1/2}$ which is the flow component of the voltage signal.

If two different sensing resistors $40_1$ and $40_2$ with different wire lengths, are operated with the same current at zero gas flow, with other operating conditions being the same, the result for the first resistor $40_1$ at zero gas flow is:

$$V_{w1}(0)=[C_0R_{w1}A_1(T_w-T_f)]^{1/2} \tag{16}$$

The result for the second resistor $40_2$ is:

$$V_{w2}(0)=[C_0R_{w2}A_2(T_w-T_f)]^{1/2} \tag{17}$$

Dividing Equation 16 by Equation 17 gives:

$$V_{w1}(0)/V_{w2}(0)=[R_{w1}A_1/R_{w2}A_2]^{1/2} \tag{18}$$

At a specific mass flow rate dm/dt, Equation 9 shows that for the first resistor $40_1$:

$$V_{w1}(f)=[C_1R_{w1}A_1(T_w-T_f)(dm/dt)^{1/2})]^{1/2} \tag{19}$$

And for second resistor $40_2$:

$$V_{w2}(f)=[C_1R_{w2}A_2(T_w-T_f)(dm/dt)^{1/2})]^{1/2} \tag{20}$$

Dividing Equation 19 by Equation 20 gives:

$$V_{w1}(f)/V_{w2}(f)=[R_{w1}A_1/R_{w2}A_2]^{1/2} \tag{21}$$

It is to be noted that the right hand side of Equation 21 is the same as the right hand side of Equation 18 so that:

$$V_{w1}(f)/V_{w2}(f)=V_{w1}(0)/V_{w2}(0) \tag{22}$$

Equation 22 shows that the ratio of the flow components $V_w(f)$ of the voltage drops across two sensing resistors $40_1$, and $40_2$ at a given gas flow rate is the same as the ratio of their offset components $V_w(0)$ obtained at zero gas flow rate conditions.

The relationship set forth in Equation 22 is used as follows when the sensing resistor of the sensor is changed and is described in connection with the simplified hot wire anemometer shown in FIG. 2. The description would be equally applicable to the gas flow rate sensor shown in FIG. 4.

Figure 5:
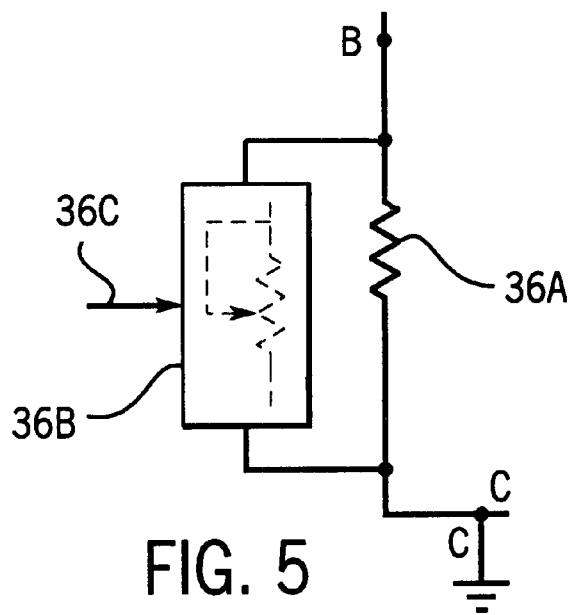
FIG. 5 is a partial schematic diagram of an adjustable resistance portion of the bridge circuit of the flow sensor of FIG. 4.

As noted above in connection with the description of the constant temperature hot wire gas flow sensor of FIG. 2, at zero gas flow conditions, the control loop containing amplifier 54 operates to place the bridge circuit in the balanced state with a desired current, for example, 100 milliamps, through the existing sensing resistor which may be deemed to be resistor $40_1$. The current through resistor $40_1$ at which the bridge circuit is balanced at the zero gas flow condition is selected to produce a desired operating temperature of, for example, 260° C., for the sensing resistor. The resistance of potentiometer 36 shown in FIG. 2 is altered to establish the current at which the bridge circuit is in the balanced state. In a practical embodiment of the sensor of the present invention, a digital potentiometer 36B may be connected in parallel with resistor 36A, as shown in FIG. 5. The resistance of digital potentiometer 36B may be controlled by the appropriate signals in signal bus 36C.

The current through resistor $40_1$ may be sensed most directly by placing an ammeter (not shown) in series with the sensing resistor. Or, the current can be obtained by using a bridge circuit resistor 32, the resistance of which is accurately known, by obtaining the voltages at terminals A and D of the bridge circuit, i.e. the voltage across resistor 32, and by dividing the latter by the former to determine the current through that resistor and series connected sensing resistor $40_1$.

The gas flow sensor having the desired current through resistor $40_1$ at zero gas flow conditions will produce the voltage $V_{w1}(0)$ which is the zero flow offset voltage component. The voltage $V_{w1}(0)$ may be obtained when exposing the sensor resistor $40_1$ to a readily available gas, such as air, at zero gas flow and the value of $V_{w1}(0)$ so obtained is retained as a reference or compensating value for the gas sensor. The foregoing steps will typically be carried out prior to placing the gas sensor in service.

In the gas sensing operations of the gas flow sensor, the voltage $V_{w1}(0)$ is offset against the voltage output obtained from the sensing resistor $V_{w1}$ so as to provide the flow sensitive voltage component $V_{w1}(f)$ which is used to generate the output signal for the gas flow rate sensor.

When sensing resistor $40_1$ is replaced with a different sensing resistor $40_2$, the need for compensation arises since the length of the wire forming the resistance of resistor $40_2$ will almost inevitably be different than the length of the wire that formed the resistance of resistor $40_1$. The following procedure is performed. The bridge circuit is energized with the new sensing resistor $40_2$ under zero gas flow conditions for the same gas, such as air, used to obtain offset voltage $V_{w1}(0)$ for first resistor $40_1$. Potentiometer 36 is adjusted so that the control loop for the bridge circuit establishes the same desired current of, for example, 100 milliamps, through resistor $40_2$ when the bridge circuit is in the balanced condition. The voltage across resistor $40_2$ under such conditions is measured as offset voltage $V_{w2}(0)$.

The original zero gas flow offset voltage $V_{w1}(0)$ and the new zero gas flow offset voltage $V_{w2}(0)$ are now known. A ratio comprising the right hand side of Equation 22 can therefore be established and represented by a ratio factor L.

During the sensing of gas flow rates using sensing resistor $40_2$, factor L can be applied to the flow component voltage $V_{w2}(f)$ obtained from sensing resistor $40_2$ to alter the magnitude of the flow component voltage $V_{w2}(f)$ so that it becomes the same as the magnitude of the flow component voltage $V_{w1}(f)$ for the same gas flow rate. With the alteration to voltage $V_{w2}(f)$, the flow rate indicating output of the sensor remains the same even though the sensing resistor $40_1$ has been replaced with a different sensing resistor $40_2$ having a different wire length, and hence resistance. In the circuitry shown in FIG. 4, the ratio factor L can be applied to the signal $Q_{out}$ in the signal processing circuitry of the output circuit 70 to provide the necessary compensation to the output signal.

The present invention thus provides a simple technique for retaining the accuracy of a hot wire gas flow rate sensor when the hot wire sensor resistor is changed. It particularly avoids the need to recalibrate the sensor using a conventional calibrating gas source providing a series of known magnitude gas flow rates.

Compensating the Gas Flow Rate Sensor for Differences in Gas Compensation

As will be noted from Equation 5, the voltage drop across sensing resistor 40 is dependent on the heat transfer coefficient "h" of the resistor, which in turn, is dependent on the constants $C_0$ and $C_1$, as shown in Equation 6 and discussed in connection with Equation 3. The constants $C_0$ and $C_1$ depend on the composition of the gas, the flow rate of which is being measured. This circumstance needs to be considered if the sensor is calibrated using one gas, such as air, but is used to measure the flow rate of a gas of different composition, such as the expired breathing gases of a subject. Further, if a series of flow measurements are being made, the composition of the gas, such as exhaled breathing gases, may change over time. For example, on a short term basis, the composition of exhaled breathing gases may change over the course of the expiratory phase of the respiratory cycle. On a longer term basis, the composition of exhaled breathing gases may change as the condition of the patient changes. Unless compensation is provided, the voltage drop across the sensing resistor may not accurately reflect the flow rate of the gas due to the changes in the composition of the gas.

In the present invention, compensation for differences in gas composition is provided in a manner somewhat analogous to that by which compensation is provided for differences in wire length of sensing resistor 40 when replacing the sensing resistor.

Since factor $C_0$, the zero flow factor, and $C_1$, the flowing gas factor, are both functions of gas composition, any change in gas composition will effect factors $C_0$ and $C_1$ in the same ratio. For example, gases of two different compositions will give two different of coefficient pairs: ($C_0'$, $C_1'$) for gas of the first composition and ($C_0''$, $C_1''$) for gas of the second composition; then:

$$C_0'/C_0''=C_1'/C_1'' \tag{23}$$

At the same flow rate for gas of the first composition and gas of the second composition, the voltage drop across the sensing resistor for the gas of the first composition is:

$$V_w'=[(C_0'R_wA(T_w-T_f)+C_1'R_wA(T_w-T_f)(dm/dt)^{1/2})]^{1/2} \tag{24}$$

and the voltage drop across the sensing resistor for the gas of the second composition is:

$$V_w''=[(C_0''R_wA(T_w-T_f)+C_1''R_wA(T_w-T_f)(dm/dt)^{1/2})]^{1/2} \tag{25}$$

For the portions of the voltage drop across the sensing resistor comprising the zero flow condition offset for the gas of the first composition, the equation is:

$$V_w'(0)=[C_0'R_wA(T_w-T_f)]^{1/2} \tag{26}$$

The result for the gas of the second composition is:

$$V_w''(0)=[C_0''R_wA(T_w-T_f)]^{1/2} \tag{27}$$

Dividing Equation 26 by Equation 27 gives:

$$V_w'(0)/V_w''(0)=C_0'/C_0'' \tag{28}$$

At a specific mass flow rate dm/dt for the gas of the first composition:

$$V_w'(f)=[C_1'R_wA(T_w-T_f)(dm/dt)^{1/2}]^{1/2} \tag{29}$$

And for the gas of the second composition:

$$V_w''(f)=[C_1''R_wA(T_w-T_f)(dm/dt)^{1/2}]^{1/2} \tag{30}$$

Dividing Equation 29 by Equation 30 gives:

$$V_w'(f)/V_w''(f)=C_1'/C_1'' \tag{31}$$

Equation 23 shows that the right hand side of Equation 28 is equal to the right hand side of Equation 31 so that:

$$V_w'(f)/V_w''(f)=V_w'(0)/V_w''(0) \quad (32)$$

Thus, the flow component parts of the voltage drops across resistor 40 will be affected in the same manner as its offset, or zero gas flow parts, when the composition of the gas, the flow of which is being measured, varies.

The operation of the sensor to provide compensation for gases of different compositions, may be carried out in the following manner. For purposes of explanation this compensation is described as separate from compensation for replacement of the sensing resistor. In practice, and as noted below, the two forms of compensation may be combined. The sensor is operated to expose the sensing resistor 40 to be used to measure gas flow rates to a gas of known or reference composition, such as air, at zero gas flow rate conditions. The bridge circuit is placed in balance with a desired current through resistor 40 for establishing the temperature of resistor 40. This is carried out by adjusting potentiometer 36 so that sensing resistor 40 provides a signal at zero flow conditions of the known gas. This signal may comprise $V_w'(0)$.

The operation of the sensor may result in sensing resistor 40 being exposed to gas of the second composition. A zero flow rate condition is then established on resistor 40. When the second gas comprises the exhaled breathing gases of a patient, the measurement of the exhaled gases may be made during the inspiratory phase of the respiratory cycle when there is no flow of the exhaled breathing gases. The voltage drop across sensing resistor 40 under these conditions is obtained as voltage $V_w''(0)$.

The two zero flow offset voltages $V_w'(0)$ and $V_w''(0)$ are now known. A ratio comprising the right hand side of Equation 32 can therefore be established and represented by a ratio factor C.

During the sensing of gas flow rates of gas of the second composition, factor C can be applied to the measured flow component voltage $V_w''(f)$ so that the magnitude of the flow component voltage $V_w''(f)$ is the same as the magnitude of the flow component voltage $V_w'(f)$ for the reference gas at the same gas flow rate. The gas flow rate indicating output of the sensor thus remains the same as that produced by the gas flow rate sensor for the same flow rate of the first or reference gas even though a gas of different gas composition is being measured. The accuracy of the read out of the instrument is thus not affected by the change in gas composition.

In an application, such as measuring the flow rate of exhaled breathing gases, in which the composition of the measured gas is likely to change, values $V_w''(0)$ can be periodically obtained for use in flow rate measuring.

Compensation for changes in gas compensation is deemed advisable to maintain and enhance the accuracy of gas flow rate measurement. However, it should be noted that, in practice, the compensation required for changes in gas compensation tends to be fairly small. For example, the amount of compensation required between operating the sensor to measure the flow rate of pure oxygen and operating the sensor to measure the flow rate of air is approximately 2%.

Calibration of the Gas Flow Rate Sensor

In practice, the gas flow rate sensor is initially calibrated at the conclusion of manufacturing and thereafter released for field service. In the initial calibration, a calibration or reference sensing resistor that is used for purposes of calibration is placed in the bridge circuit as the sensing resistor 40. The measuring chamber or passage 42 for the sensor is filled with a gas of known composition, such as air, and flow through the measuring passage is stopped. The bridge circuit is adjusted so that resistor 40 carries the desired current, for example 100 mA, when in the balanced condition. The resistance of potentiometer 36 is altered to achieve the balanced condition in the bridge circuit at the desired current. The voltage drop across the sensing resistor is determined with the bridge in the balanced condition. With no gas flow in the sensing passage, this voltage comprises $V_{w\_ref}(0)$. This value is then stored in memory 88 in the sensor. Memory 88 may comprise an electrically erasable programmable read only memory (EEPROM).

A flow of the gas of known composition at a known flow rate (dm/dt) is then created in the passage by a calibration gas flow generator. The voltage drop across the calibration sensing resistor under these conditions is obtained as $V_{w\_ref}$. In order to determine the flow dependent component part $V_{w\_ref}(f)$ of this signal, the gas flow offset voltage component must be subtracted from the total voltage drop $V_{w\_ref}$ across the calibration sensing resistor. This calculation is carried out in the following manner:

$$V_{w\_ref}(f)=[(V_{w\_ref})^2-(V_{w\_ref}(0))^2]^{1/2} \quad (33)$$

The flow dependent component is then placed in the memory 88 along with the corresponding flow rate (dm/dt). This process is repeated for a plurality of different gas flow rates so that a lookup table of flow component voltage drops and corresponding gas flow rates is formed in the memory 88 to complete the calibration procedure for the flow sensor. A calibration curve relating the output signal $Q_{out}$ to the flow rate of the gas can also be provided for use with output circuit 70 so that the output signal will correctly indicate the flow rate of the gas.

Prior to releasing the sensor for use, the reference sensing resistor used in the calibration is replaced with a field service sensing resistor 40.

When the sensor is used in the field to measure the unknown flow rate of gas of unknown composition, the following startup procedure is employed. A gas of known composition, such as air, is provided to the passage 42 containing sensing resistor 40. A zero flow rate condition is created in the passage. Potentiometer 36 is adjusted so that the desired current, for example 100 mA, passes through resistor 40 with the bridge circuit in the balance condition. The voltage drop across sensing resistor 40 is measured under these conditions to obtain the zero flow rate offset voltage component $V_w(0)$.

The value of $V_{w\_ref}(0)$ for the reference sensing resistor at zero gas flow is obtained from the memory 88 and a correction factor K is obtained as:

$$K=V_w(0)/V_{w\_ref}(0) \quad (34)$$

The factor K may be seen to combine both factor L and factor C discussed separately above. The inclusion of factor L arises because of the replacement of the calibration sensing resistor with the field service sensing resistor 40 and the resulting change in the resistance of the sensing resistor. At this point factor C, arising because of differences in the composition of the gas, the flow rate of which is being measured, is one since the same gas, air, is being used to obtain the zero flow rate offset voltage components.

Gas flow is then provided in passage 42 containing sensing resistor 40. The voltage drop $V_w$ across sensing resistor 40 is determined for the condition in which gas is flowing in passage 42 and the value of the voltage flow dependent component part $V_w(f)$ is calculated as follows:

$$V_w(f)=[(V_w)^2-(V_w(0))^2]^{1/2} \quad (35)$$

Equation 35 resembles Equation 33 except that the zero flow voltage drop across sensing resistor 40 and the voltage drop across the resistor under flow conditions are determined for the actual sensing resistor 40 used in the field flow measurement rather than the reference sensing resistor used during calibration.

The voltage drop $V_w(f)$ across sensor resistor 40 is then corrected or compensated for differences in the length of the wire forming sensing resistor 40 over that of the reference sensing resistor and for differences in compensation of the gas, the flow of which is being measured, over that used in calibration.

For this purpose, factor K is applied to the flow component voltage drop $V_w(f)$ across sensing resistor 40 under conditions in which a gas flow is occurring as:

$$V_{w\_corr}(f) = V_w(f)/K \qquad (36)$$

Applying the factor K to the voltage drop across the sensing resistor obtained in field use of the sensor places the value $V_{w\_corr}(f)$ at the same value as $V_{w\_ref}(f)$ used to construct the lookup table in the memory.

The voltage $V_{w\_corr}(f)$ is then taken to the lookup table in the memory to obtain the gas flow rate corresponding to that corrected voltage as determined during the calibration procedure. Depending on the number of readings taken during the calibration of the sensor, it may be necessary to interpolate between values in the table to obtain the gas flow rate. The gas flow rate so determined is then provided as $Q_{out}$ of the sensor.

In an application in which the composition of the gas, the flow rate of which is being measured, is subject to change, measurement of the voltage drop across sensing resistor 40 at zero gas flow conditions may be undertaken periodically throughout the measurement period. As noted above, when the sensor is being used to measure the expiratory gas flow rate of a subject, the zero gas flow rate condition in the expiratory breathing gas passage can be obtained during the inspiratory phase of the respiratory cycle. A new, offset voltage component $V_w(0)$ is obtained and used to compute a new factor K. That is, when the gas, the flow rate of which is being measured is no longer air, the offset voltage component $V_w(0)$ will change and factor C reflecting changes in gas composition will no longer be one. Factor K will thus also change. The new factor K is, in turn, is applied to a subsequently obtained flow component voltage $V_w(f)$ to accurately account for any changes in gas composition. This will ensure that accurate gas flow rate readings are obtained even though the composition of the gases exhaled by the patient may change with time.

The start up procedure leading to the determination of factor K is also carried out when sensing resistor 40 is changed in the gas sensor.

It is recognized that other equivalents, alternatives, and modifications in addition to those expressly stated, are possible and within the scope of the appended claims.

What is claimed is:

1. Improved circuitry for a hot wire gas flow rate sensor, the sensor having a bridge circuit containing a hot wire sensing resistor exposed to the gas, the flow rate of which is measured, control means coupled to the output of the bridge circuit for energizing the input of the bridge circuit to provide a current through the sensing resistor which maintains the resistance of the sensing resistor at a desired value as gas flows past the sensing resistor, the voltage drop across the sensing resistor being an indication of the flow rate of the gas and the voltage drop increasing as the gas flow rate increases, said circuitry comprising:

a differential amplifier operable by a differential input signal and providing an output signal responsive thereto, said differential amplifier being driven into a saturated state when said differential input signal is of a predetermined magnitude, said differential amplifier receiving a signal corresponding to the sensing resistor voltage drop at a first input thereof;

bias signal means for providing a bias signal to a second input of said differential amplifier to form, with said voltage drop signal, the differential input signal to said differential amplifier;

means responsive to the magnitude of the voltage drop signal supplied to said first input of said differential amplifier for establishing the magnitude of the bias signal provided to said second input at a level that limits the differential input signal formed by the difference between the bias signal and the voltage drop signal to one that does not exceed the predetermined magnitude over a range of the voltage drop signal; and output circuitry receiving the output of said differential amplifier for providing an indication of the flow rate of the gas.

2. The improved gas flow rate sensor circuitry according to claim 1 wherein said bias signal magnitude establishing means is further defined as changing the magnitude of the bias signal responsive to the magnitude of the voltage drop signal so that the differential input signal to said differential amplifier does not exceed said predetermined magnitude as the magnitude of the voltage drop signal varies.

3. The improved gas flow rate sensor circuitry according to claim 1 wherein said bias signal magnitude establishing means is further defined as including a comparator for comparing the magnitude of the voltage drop signal to at least one reference value to establish the magnitude of the bias signal.

4. The improved gas flow rate sensor circuitry according to claim 3 wherein said bias signal magnitude establishing means is further defined as comprising a comparator for comparing the magnitude of the voltage drop signal to a plurality of reference values for providing a bias signal at a level that limits the differential input signal to the differential amplifier to a value not greater than the predetermined magnitude differential input signal.

5. The improved gas flow rate sensor circuitry according to claim 4 wherein said comparator is further defined as coupled to means providing a plurality of signals of differing magnitudes, and wherein said bias signal magnitude establishing means includes means for selecting a desired one of said plurality of signals for provision to said differential amplifier as a bias signal.

6. The improved gas flow rate sensor circuitry according to claim 5 wherein said selecting means comprises a logic circuit interposed between said comparator and said signal providing means.

7. The improved gas flow rate sensor circuitry according to claim 5 wherein said bias signal magnitude establishing means provides a scaling signal to said output circuitry in accordance with the magnitude of the bias signal for causing the output circuit to provide a signal correctly indicating the flow rate of the gas.

8. The improved gas flow rate sensor circuitry according to claim 5 further including an input amplifier having an input receiving said voltage drop signal and an output connected to said first input of said differential amplifier.

9. The improved gas flow rate sensor circuitry according to claim 1 wherein the output signal of said differential amplifier is provided to an analog to digital converter for supply to said output circuitry.

10. The improved gas flow rate sensor circuitry according to claim 1 wherein said bias signal magnitude establishing means provides a scaling signal to said output circuitry in accordance with the level of the bias signal for causing the output circuit to provide a signal correctly indicating the flow rate of the gas.

11. The improved gas flow rate sensor circuitry according to claim 1 further including an input amplifier having an input receiving said voltage drop signal and an output connected to said first input of said differential amplifier.

12. The improved gas flow rate sensor circuitry according to claim 1 further defined as circuitry for a breathing gas flow rate sensor.

13. The improved gas flow rate sensor circuitry according to claim 12 further defined as circuitry for an expired breathing gas flow rate sensor.

14. A method for measuring the flow rate of a gas passing a sensing resistor provided with current to maintain the resistance of the resistor at a constant value, said method comprising the steps of:
supplying a voltage drop signal from the resistor to a first input of a differential amplifier, said differential amplifier being driven into a saturated state by a differential input signal of a predetermined magnitude;
providing a bias signal to a second input of the differential amplifier to form, with the voltage drop signal, the differential input signal to the differential amplifier;
establishing the magnitude of the bias signal at a level that limits the differential input signal to not greater than the predetermined magnitude over a given range of the voltage drop signal; and
changing the magnitude of the bias signal as the magnitude of the voltage drop signal varies so that the differential input signal does not exceed the predetermined magnitude,
an output signal of said differential amplifier providing an indication of the gas flow rate of the gas.

15. The method according to claim 14 wherein the step of changing the magnitude of the bias signal is further defined as changing the magnitude in at least one discrete step.

16. A method according to claim 15 wherein the step of changing the magnitude of the bias signal is further defined as comparing the voltage drop signal with a reference to provide a bias signal sufficient to prevent the differential input signal to the differential amplifier from exceeding the predetermined magnitude.

17. A method according to claim 16 wherein the step of changing the magnitude of the bias signal is further defined as comparing the voltage drop signal with a plurality of reference values and providing a bias signal determined in accordance with the comparison to the second input of the differential amplifier.

18. A method according to claim 14 further defined as scaling the output of the differential amplifier circuit for providing a correct indication of the flow rate of the gas.

19. A method according to claim 14 further defined as amplifying the voltage drop signal prior to supplying same to the first input of the differential amplifier.

20. A method according to claim 14 further defined as subjecting the output signal of the differential amplifier to an analog-digital conversion.

21. A method of compensating a bridge circuit gas flow rate sensor when replacing a first hot wire sensing resistor with a second hot wire sensing resistor, said method comprising the steps of:
(a) at zero gas flow, operating the bridge circuit containing the first sensing resistor ($40_1$) to establish a balanced condition in the bridge circuit at a desired current through the first sensing resistor;
(b) determining the voltage drop ($V_{w1}(0)$) across the first sensing resistor at such conditions;
(c) at zero gas flow, operating the bridge circuit containing the second sensing resistor ($40_2$) to establish a balanced condition in the bridge circuit with the desired current through said second sensing resistor;
(d) determining the voltage drop ($V_{w2}(0)$) across the second sensing resistor at such conditions; and
(e) establishing a ratio of the voltage drops so determined across the first and second sensing resistors which, when applied to the flow component $V_{w2}(f)$ of the voltage drop across said second sensing resistor when sensing gas flow, compensates the sensor for the replacement of said first sensing resistor with said second sensing resistor.

22. The method according to claim 21 wherein the first and second sensing resistors are exposed to the same gas at zero gas flow.

23. The method according to claim 21 wherein the steps of operating the bridge circuit containing the first resistor at zero gas flow and determining the voltage drop across the first sensing resistor at such conditions are carried out as an initial calibrating procedure.

24. The method of claim 21 further defined as a method of compensating a gas flow rate sensor for changes in the composition of gas, the flow rate of which is being measured, said method further comprising the steps of:
(f) at zero gas flow, operating the bridge circuit with the second sensing resistor exposed to a first gas of a first composition to establish a balanced condition in the bridge circuit at a desired current through the sensing resistor;
(g) determining the voltage drop ($V_w'(0)$) across the second sensing resistor at such conditions for the first gas;
(h) at zero gas flow conditions, operating the bridge circuit with the second sensing resistor exposed to a second gas of a second composition;
(i) determining the voltage drop ($V_w''(0)$) across the second sensing resistor at such conditions for the second gas; and
(j) establishing a ratio of the voltage drops so determined across the second sensing resistor which, when applied to the flow component $V_w''(f)$ of the voltage drop across said sensing resistor when sensing the flow of the second gas, compensates the sensor for the change in the composition of the gas, the flow rate of which is being measured.

25. The method according to claim 24 wherein steps (c) and (d) of claim 21 and steps (f) and (g) of claim 24 comprise common steps.

26. The method of claim 24 wherein steps (h) through (j) are periodically repeated.

27. A method of compensating a gas flow rate sensor for changes in the composition of gas, the flow rate of which is being measured, said gas sensor having a hot wire sensing resistor in a bridge circuit, said method comprising the steps of:
(a) at zero gas flow, operating the bridge circuit with the sensing resistor exposed to a first gas of a first composition to establish a balanced condition in the bridge circuit at a desired current through the sensing resistor;
(b) determining the voltage drop ($V_w'(0)$) across the sensing resistor at such conditions for the first gas;
(c) at zero gas flow, operating the bridge circuit with the sensing resistor exposed to a second gas of a second composition;
(d) determining the voltage drop ($V_w''(0)$) across the sensing resistor at such conditions for the second gas; and
(e) establishing a ratio of the voltage drops so determined across the sensing resistor which, when applied to the flow component $V_w''(f)$ of the voltage drop across said sensing resistor when sensing the flow of the second gas, compensates the sensor for the change in the composition of the gas, the flow rate of which is being measured.

28. The method according to claim 27 wherein steps (c) through (e) are periodically repeated.

* * * * *